No. 664,302. Patented Dec. 18, 1900.
M. V. B. TRENT.
CHURN DASHER.
(Application filed Mar. 22, 1900.)
(No Model.)
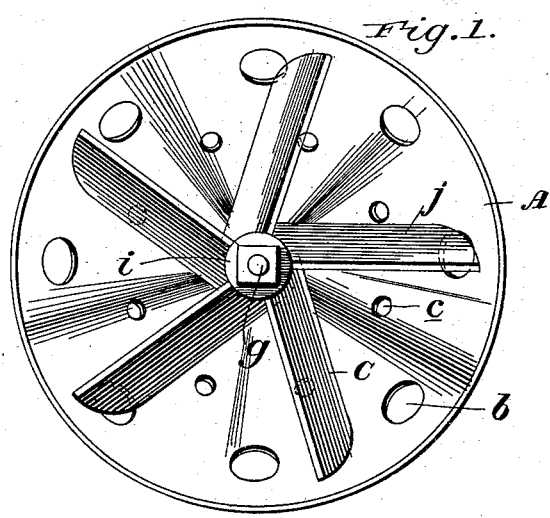
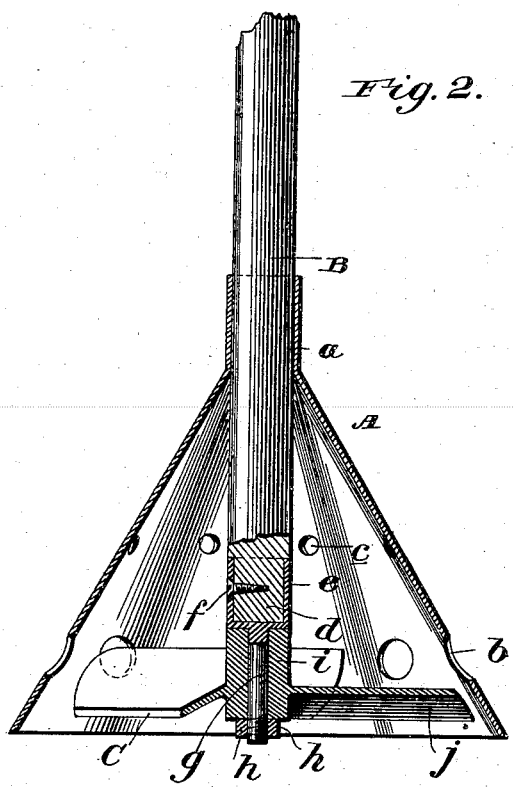

UNITED STATES PATENT OFFICE.

MARTIN V. B. TRENT, OF IBERIA, MISSOURI.

CHURN-DASHER.

SPECIFICATION forming part of Letters Patent No. 664,302, dated December 18, 1900.

Application filed March 22, 1900. Serial No. 9,727. (No model.)

*To all whom it may concern:*

Be it known that I, MARTIN V. B. TRENT, a citizen of the United States, residing at Iberia, in the county of Miller and State of Missouri, have invented new and useful Improvements in Churn-Dashers, of which the following is a specification.

My invention relates to dashers for use in churns and the like; and it consists in a certain peculiar construction the novelty, utility, and advantages of which will be fully understood from the following description and claim when taken in conjunction with the annexed drawings, in which—

Figure 1 is an inverted plan view of my improved dasher. Fig. 2 is a diametrical section of the same.

Referring by letter to said drawings, A is the dasher-body, which is preferably made of light sheet metal in the form of a cone. Said body is provided at its upper end with a sleeve $a$ and is also provided with lower and upper circular series of apertures $b$ $c$, the lower apertures being by preference larger than the upper ones.

B is the dasher-handle, which is preferably of wood. Said handle extends through and is suitably secured in the sleeve of the body, and in the preferred embodiment of the invention it has its lower end reduced, as indicated by $d$, to receive a metallic ferrule $e$, which is secured to it by a screw $f$, and is provided with a depending stud-journal $g$, threaded at its lower end to receive a nut $h$.

C is a horizontally-disposed wheel which is arranged within the body in a plane slightly above the lower end thereof. The said agitating-wheel comprises a hub $i$, apertured to receive the stud-journal, on which it is retained by the nut, and the blades $j$, which extend from the hub to a point adjacent to the inner side of the body and are arranged in a plane slightly below the apertures $b$ of the body, as shown in Fig. 2. The said blades are pitched in the direction of their width at an angle of about forty-five degrees from the vertical, as illustrated. By virtue of the wheel C having blades disposed at an angle of about forty-five degrees and being arranged within the cone-shaped body A, provided with apertures $b$, it will be seen that when the dasher is forced downwardly in a body of milk the centrifugal action of the wheel C will throw the milk through the apertures $b$ and against the portion of the body A below said apertures, with the result that the milk will be materially agitated and the breaking of the globules containing butter materially accelerated. It will also be seen that incident to the up movement of the dasher a portion of the milk will be caused to pass downwardly and inwardly through the apertures $b$, which will also assist in breaking the globules containing butter.

Having described my invention, what I claim, and desire to secure by Letters Patent, is—

The herein-described dasher for use in churns and the like, consisting essentially of the cone-shaped body having the horizontal series of unobstructed apertures $b$ adjacent to its lower edge, the stick resting in the center of the body and connected to the upper end thereof, and the agitating-wheel journaled on the stick and having radial blades inclined in the direction of their width; the said wheel being arranged entirely within the body with its blades disposed in a plane slightly below the apertures $b$ thereof, substantially as and for the purpose set forth.

In testimony whereof I have hereunto set my hand in presence of two subscribing witnesses.

MARTIN V. B. TRENT.

Witnesses:
G. W. MACE,
J. B. JACOBS.